United States Patent [19]

Frauenglass

[11] Patent Number: 4,998,219
[45] Date of Patent: Mar. 5, 1991

[54] METHOD AND APPARATUS FOR DETERMINING THE GREATEST VALUE OF A BINARY NUMBER AND FOR MINIMIZING ANY UNCERTAINTY ASSOCIATED WITH THE DETERMINATION

[75] Inventor: Richard M. Frauenglass, Holbrook, N.Y.

[73] Assignee: AIL Systems, Inc., Deer Park, N.Y.

[21] Appl. No.: 312,674

[22] Filed: Feb. 16, 1989

[51] Int. Cl.$^5$ .............................................. G06F 7/24
[52] U.S. Cl. ............................................. 364/715.06
[58] Field of Search ................. 364/715.06; 340/146.2

[56] References Cited

U.S. PATENT DOCUMENTS

| | | | |
|---|---|---|---|
| 3,546,442 | 12/1970 | Reader | 340/146.2 |
| 3,757,298 | 9/1973 | Tumbush | 340/146.2 |
| 4,101,903 | 7/1978 | Slay | 340/146.2 |
| 4,539,549 | 9/1985 | Hong et al. | 340/146.2 |

Primary Examiner—Dale M. Shaw
Attorney, Agent, or Firm—Hoffmann & Baron

[57] ABSTRACT

A circuit for determining which of a plurality of binary numbers has the greatest decimal equivalent includes a binary-to-decimal converter which converts each of the binary numbers to a decimal equivalent code, a series of logic OR gates which OR together corresponding bits of like decimal value of each of the decimal equivalent codes, a priority encoder which compares the outputs of the OR gates, determines which output of the OR gates is active and has the greatest decimal value of the decimal codes, and converts the decimal code having the greatest value to a binary number, and a comparator which compares the binary number from the priority encoder with each of the binary numbers provided to the binary-to-decimal converter. A circuit for minimizing any uncertainty which may arise with a greatest value determination includes a series of logic OR gates which OR together bits of like decimal value of the binary numbers, a multiplexer controller which is responsive to the outputs of the logic OR gates and which determines which is the most significant active bit of the binary numbers, and a multiplexer which selects a certain number of bits of the binary numbers to provide to the greatest value determination circuit.

14 Claims, 4 Drawing Sheets

METHOD AND APPARATUS FOR DETERMINING THE GREATEST VALUE OF A BINARY NUMBER AND FOR MINIMIZING ANY UNCERTAINTY ASSOCIATED WITH THE DETERMINATION

BACKGROUND OF THE INVENTION

1. Field Of The Invention

The present invention generally relates to a method and apparatus for comparing binary numbers, and more particularly relates to a method and apparatus for determining which of a plurality of binary numbers has the greatest value.

Even more specifically, the present invention relates to a method and apparatus for determining which binary number of a plurality of binary numbers has the greatest decimal value, and for minimizing any uncertainty associated with the determination.

2. Description Of The Prior Art

"Greatest of" or "GOF" circuits are well known in the art. A GOF circuit is oftentimes employed when it is necessary to determine which one or ones of a plurality of digital or analog signals has the greatest value.

For example, an analog GOF circuit can be embodied as a parallel arrangement of transistors having their emitters connected together. The base of each transistor receives one of a plurality of analog signals to be compared. The signal having the greatest amplitude will forward bias its corresponding transistor which, in turn, has the effect of back biasing the transistors connected to lower amplitude signals. The collector circuits of the transistors may be monitored to determine which transistor is turned on, indicating the signal of greatest amplitude.

One known technique for determining the greatest value of digitally coded signals, such as binary numbers, utilizes an iterative comparison method. In this method, one bit of each number at a time is compared sequentially with the corresponding bits of the other numbers being compared, usually starting with the most significant bit, the process being repeated with the second most significant bit, and so on, until a determination may be made.

A variation on the iterative method is one in which the first number of a set is subtracted from the second, the greater stored, compared against the third, continuing the process until the entire set has been tested.

Such iterative processes consume a significant amount of time, especially as the set of numbers being compared becomes large, or when each number being compared comprises a large number of bits.

Another digital technique for comparing binary numbers is commonly referred to as a "tree comparison" method. According to this process, pairs of binary numbers are compared in a first level of comparison. The largest numbers of the pairs are again compared in pairs in a second level of comparison. The method continues through various comparison levels until a comparison of the remaining pair of numbers yields the greatest number.

However, this technique proves inefficient in terms of its implementation and the physical devices it requires.

OBJECTS AND SUMMARY OF THE INVENTION

It is an object of the present invention to provide an apparatus for determining which binary number of a plurality of binary numbers has the greatest value, which apparatus requires a minimal number of physical devices.

It is another object of the present invention to provide a method for determining which of a plurality of binary numbers has the greatest value, which determination is made in a minimal time interval.

It is a further object of the present invention to provide a method and apparatus for determining which binary number of a plurality of binary numbers has the greatest value, which method and apparatus minimizes any uncertainty associated with the determination when fewer than all of the bits of the binary numbers can be compared.

It is yet a further object of the present invention to provide a method and apparatus for determining which of a plurality of binary numbers has the greatest value, which method and apparatus overcome the inherent disadvantages of known techniques and circuits.

In accordance with one form of the present invention, an apparatus for determining which of a plurality of binary numbers has the greatest value is in the form of a circuit and includes a binary-to-decimal converter which converts each of the binary numbers inputted to the circuit to a decimal equivalent code, each bit of the code representing a different decimal value for the number it corresponds to. A series of OR gates logic OR together the bits of like decimal value of the decimal codes. A priority encoder determines which of the outputs of the OR gates that are active (i.e., are at a logic "1" level for positive logic systems) has the greatest decimal value, and provides an output signal in the form of a binary number representing the binary equivalent of the decimal value of the active OR'ed bit having the greatest value. A magnitude comparator compares the binary output signal of the priority encoder with each of the binary numbers inputted to the circuit, and provides an output signal indicating which of the inputted binary numbers equals the binary output signal of the priority encoder. This indicating signal of the comparator identifies the binary number having the greatest value.

The method of determining which of the plurality of binary numbers has the greatest value, in one form, includes the steps of converting each of the binary numbers to a decimal equivalent code, each bit of the code representing a different decimal value for the number it corresponds to, logic OR'ing together the bits of like decimal values of the decimal codes, determining which of the logic OR'ed together bits that are active has the greatest decimal value, providing a signal in the form of a binary number representing the binary equivalent of the decimal value of the active OR'ed together bits having the greatest value, comparing the binary signal with each of the binary numbers being compared, and providing an output signal indicating which of the binary numbers equals the binary signal. This output signal will identify which binary number has the greatest value.

Associated with the method and apparatus for determining the binary number having the greatest value is a method and apparatus for minimizing any uncertainty associated with the greatest value determination. Such uncertainty may arise when only a limited number of bits, for example, m number of bits, of a plurality of binary numbers having a greater number of bits, for example, n bits, can only be used in the determination method or circuit. The use of fewer bits may also be permissible if a given level of uncertainty is permissible, for whatever reason, in the comparison.

Very basically, the method of the present invention for minimizing such uncertainty includes the steps of determining the most significant bit of all of the binary numbers that is active (i.e., a logic "1" in positive logic systems or a logic "0" in negative logic systems) in at least one of the numbers, and selecting that bit from each of the binary numbers, whether that bit is active or not in any particular number from which it is selected, for manipulation by the greatest value determination circuit. $M-1$ additional bits are then selected from each binary number for manipulation by the greatest value determination circuit.

There are at least two ways of selecting the $m-1$ additional bits. The first way is to select the next lower significant bits from the first bit selected, as the $m-1$ additional bits.

Alternatively, the additional $m-1$ bits may be selected by repeating the determination step mentioned above, now for the additional bits. That is, a further determination is made as to what bit of all of the binary numbers is the next lower bit from the first bit selected that is active in at least one of the numbers. That next most significant bit is selected from each of the binary numbers, whether that bit is actually active or not in all of the binary numbers, for manipulation by the greatest value determination circuit.

In the alternative form of this method of minimizing the uncertainty associated with a greatest value determination, this last step is repeated until all $m-1$ additional lower order bits have been selected. Accordingly, it can be said that the m number of bits selected for manipulation by the greatest value determination circuit will include an m number of the most significant bits that are active in one or more of the m bit binary numbers. The numerical uncertainty of this method is the value of the number of bits of n left over when all positions above the lowest order of the m bits are removed.

An apparatus for implementing the method of minimizing the uncertainty in a greatest value determination may basically include a multiplexer which selects the m number of bits of each of the binary numbers. The binary numbers are provided to the multiplexer and, in accordance with a control signal provided to the multiplexer, only certain bits (that is, an m number of bits) of the n bit binary numbers are provided as an output of the multiplexer.

A multiplexer controller is also provided. The multiplexer controller receives the binary numbers and determines at least the most significant bit of all of the binary numbers that is active in at least one of the numbers. In accordance with this determination, the multiplex controller will send a control signal to the multiplexer, instructing the multiplexer to select certain bits (that is, m number of bits) of each binary number to be outputted by the multiplexer and to provide the same to the greatest value determination circuit.

These and other objects, features, and advantages of this invention will be apparent from the following detailed description of illustrative embodiments thereof, which is to be read in connection with the accompanying drawings.

DETAILED DESCRIPTION OF THE PREFERRED EMBODIMENTS

The term "binary" used herein refers to that system of numbers which requires the use of only two symbols, a one (1) and a zero (0), and encompasses binary codes, BCD (binary coded decimal) codes, excess three codes, and the like.

Also, the term "active" refers to the logic state of a bit or output, where that bit or output has a logic "1" in a positive logic system and has a logic "0" in a negative logic system.

Figure 1:
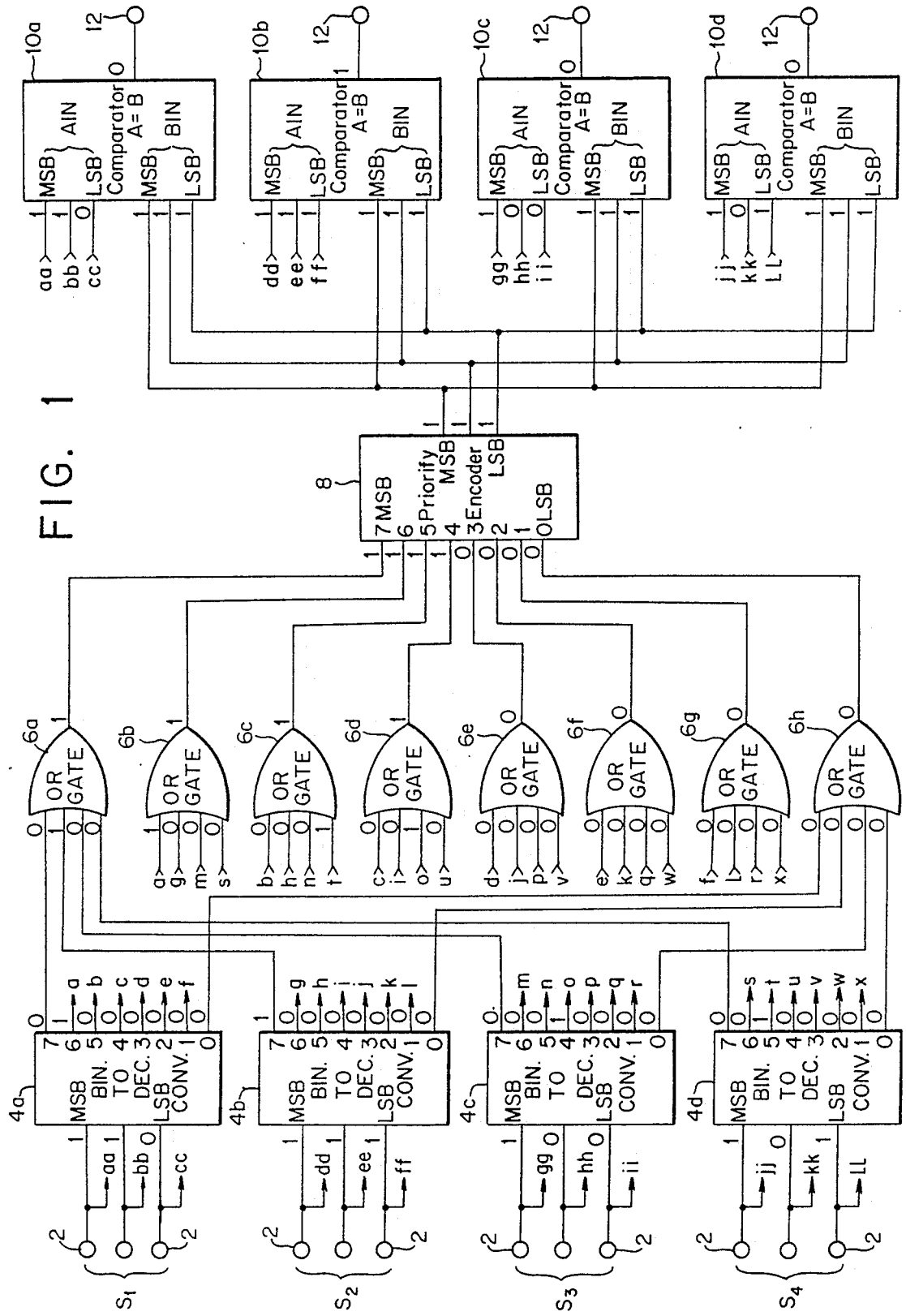
FIG. 1 is a block diagram illustrating one form of an apparatus for determining which of a plurality of binary numbers has the greatest value, which apparatus is formed in accordance with the present invention.

Initially referring to FIG. 1 of the drawings, an apparatus and method for determining which of a plurality of binary numbers has the greatest value, in the preferred form of a circuit and constructed in accordance with the present invention, will now be described. The circuit is provided with a plurality 20 of inputs 2 for receiving each bit of a plurality of binary numbers. To facilitate an understanding of the invention, FIG. 1 illustrates as an example of the greatest value determination circuit a series of four sets of inputs S1–S4, each set consisting of three input lines, so that the circuit may accept input data in the form of four binary numbers, each binary number consisting of n bits (where in the example illustrated by FIG. 1, n=3), for evaluation by the circuit.

Each set S1–S4 of data inputs is connected to one or more binary-to-decimal code converters 4a–4d, such as a binary-to-decimal decoder. Accordingly, each binary number to be compared is provided to the code converter 4a–4d.

As its name implies, the binary-to-decimal code converter 4a–4d converts the binary numbers to their decimal equivalent code. For a three bit binary number, each code converter 4a–4d would provide an output signal in the form of a decimal equivalent code having eight bits and, accordingly, would have eight outputs, each output accommodating one bit of the eight bit decimal equivalent code, as illustrated by FIG. 1. Each bit of the decimal code represents a different decimal value for the number it corresponds to, and only one bit of each decimal code of each binary number is active at any one time in its respective code. Thus, there are four code converters 4a–4d illustrated by FIG. 1 to convert the three bit binary numbers into eight bit decimal equivalent codes.

Accordingly, the binary-to-decimal code converters 4–4d would provide a plurality of sets of parallel output signals, each set representing a decimal equivalent code corresponding to a respective binary number. Each output signal of each set has a greater or lesser decimal value than any other output signal of the same set, and has a decimal value equal to that of a corresponding output signal of a different set.

Table 1 below is a truth table showing the decimal equivalent code provided on the output of the code converter 4a–4d for a three bit binary number provided on its input.

TABLE 1

| BINARY INPUT | | DECIMAL CODE OUTPUT | | | | | | | |
|---|---|---|---|---|---|---|---|---|---|
| MSB | LSB | 0 | 1 | 2 | 3 | 4 | 5 | 6 | 7 |
| 0 | 0 | 0 | 1 | 0 | 0 | 0 | 0 | 0 | 0 | 0 |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| 0 | 1 | 1 | 0 | 0 | 0 | 1 | 0 | 0 | 0 | 0 |
| 1 | 0 | 0 | 0 | 0 | 0 | 0 | 1 | 0 | 0 | 0 |
| 1 | 0 | 1 | 0 | 0 | 0 | 0 | 0 | 1 | 0 | 0 |
| 1 | 1 | 0 | 0 | 0 | 0 | 0 | 0 | 0 | 1 | 0 |
| 1 | 1 | 1 | 0 | 0 | 0 | 0 | 0 | 0 | 0 | 1 |

The circuit further includes a series of OR gates 6a–6h. Each OR gate is used to logic OR together corresponding bits of like decimal value of the decimal codes provided by the binary-to-decimal aim code converters 4a–4d. Thus, each output signal of equal decimal value of each of the plurality of sets of parallel output signals from the code converters are logically OR'ed together. Each OR gate 6a–6h has an output on which is provided a output signal representative of the logic OR'ed state of each of the OR'ed together output signals of the code converters 4a–4d.

The circuit further includes a priority encoder 8 which receives the output signals from the outputs of each logic OR gates 6a–6h. The priority encoder 8 performs several functions. First, it compares the output signals of the logic OR gates 6a–6h to determine which output signals are active (i.e., have a logic 1 level for positive logic systems). Second, the priority encoder 8 determines which of the active output signals has the greatest decimal value. Third, the priority encoder 8 converts the output signal having the greatest value to a binary number. This binary number is provided as an output signal on the output of the priority encoder 8, which output signal represents the binary equivalent of the decimal value of the active OR'ed output signal of the logic OR gates which has the greatest value.

The circuit further includes one or more magnitude comparators 10-10d for comparing the output signal provided by the priority encoder 8 with each of the plurality of binary numbers inputted to the circuit and provided to the binary-to-decimal converter 4a–4d. The output signal of the priority encoder 8 has the same number of bits as that of the binary numbers provided to the determination circuit. The comparators 10a–10d will compare the output signal of the priority encoder 8 with the binary numbers, and will provide one or more output signals which will indicate which binary number is the same as the output signal of the priority encoder 8. Thus, the binary number which is the same as the output signal of the priority encoder 8 can be identified as the binary number having the greatest value.

As an example of how the circuit operates, the logic states of the various components of the circuit are indicated by a "1" or a "0" in FIG. 1 for four binary numbers having decimal equivalent codes of 6, 7, 4 and 5 provided to input sets S1-S4, from top to bottom in FIG. 1, respectively. Since the binary number having a decimal equivalent of 7 is the largest of the four binary numbers, the priority encoder 8 will determine that the output signal on OR gate 6a is active and has the greatest decimal value, and will convert the decimal value of that signal into its binary equivalent code of three bits. The three bit binary coded signal on the output of the priority encoder 8 will be provided to each magnitude comparator 10a–10, which will compare this coded signal with the three bit binary numbers inputted to the circuit. The magnitude comparator 10b which is second from the top in FIG. 1 will provide a logic 1 level as an output signal on an output 12 of the circuit, indicating that the second binary number on input set S2 and the priority encoder output signal are equal, thus identifying the second binary number as having the greatest value.

Should two or more binary numbers having the same decimal equivalent value be inputted to the circuit, and should this value be determined to be the greatest of the remaining binary numbers, the magnitude comparators 10a–10d which compare the two or more binary numbers with the binary output signal of the priority encoder 8 will each provide an indication on their respective outputs that each of the two or more binary numbers has the greatest value of all of the binary numbers.

As can be seen from FIG. 1, for binary numbers which contain three bits, an eight bit decimal equivalent code is required for comparison purposes in the priority encoder 8. However, the number of bits of the decimal equivalent code necessary for comparison may become inordinately large as the number of bits in each binary number increases. For example, for binary numbers having six bits, there are 64 bits in the OR'ed decimal equivalent code normally provided to the priority encoder. In such a situation, it may become necessary to limit the number of bits upon which the determination of which number has the greatest value is made.

When one must limit the number of bits used in the evaluation, a level of uncertainty in the determination may arise. For example, if only the three most significant bits of each of six bit binary numbers are used in the determination of which binary number has the greatest value, the three least significant bits of each number will be dropped (i.e., not used in the determination), leaving an uncertainty of 7. However, if it is determined that it is not necessary to compare the most significant bit of the binary numbers, such as when the most significant bit of all numbers is a zero, such as for binary numbers having a decimal value of at most 31, the three next lesser significant bits from the most significant bit may be used to make the determination of which binary number is the greatest. In such a case, the uncertainty in the determination o will be 3, as only the two least significant bits are not examined. Thus, the uncertainty will be significantly minimized in the latter case than in the former.

If the two most significant bits of each of the six bit binary numbers are not needed to make the determination (for example, if the two most significant bits of each binary number are zeros such that the binary numbers have decimal values of at most 15), then bits 3 through 5 (the third through fifth bit from the most significant bit) may be used to make the determination. The uncertainty resulting in this case will be 1.

For six bit binary numbers having a decimal equivalent value of at most 7, there will be no uncertainty resulting if the three least significant bits are used for the determination; the three most significant bits of each binary number need not be examined.

Figure 2:
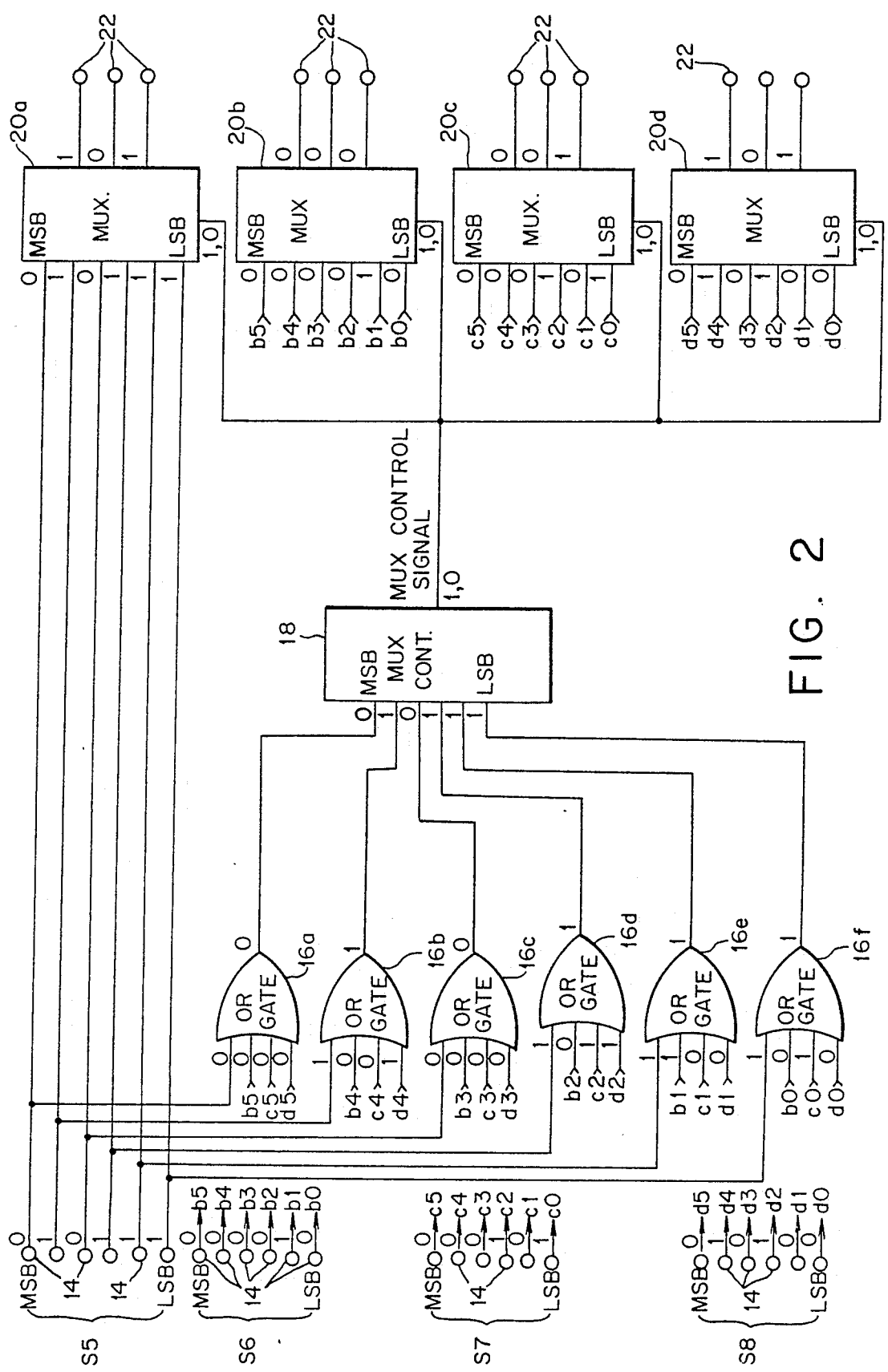
FIG. 2 is a block diagram illustrating one form of an apparatus for selecting and/or minimizing the uncertainty associated with a method or apparatus for determining the binary number of greatest value, formed in accordance with the present invention.

FIG. 2 illustrates in substantially block diagram form a circuit for minimizing the uncertainty associated with a determination of which of a plurality of binary numbers, each number having n bits, has the greatest value, when the determination is limited to using only m number of n bits of each binary number, where m is less than n. In the example shown in FIG. 2, three bits (m=aim3) of six bit (n=6) binary numbers are selected for later manipulation in the greatest value determination circuit of FIG. 1.

The circuit for minimizing the uncertainty associated with a greatest value determination includes a series of inputs 14 for receiving n bits of each n bit binary number. The inputs 14 are shown as being grouped in sets S5–S8, one set for each binary number inputted, to facilitate an understanding of the invention.

The circuit further includes a series of OR gates 16-a16f. Each OR gate receives as an input one bit of like binary value of each binary number. For example and as illustrated by FIG. 2, for four binary numbers having six bits each, six OR gates (one for each binary bit) may be used, each OR gate having four inputs (one for each binary number). The most significant bit of each of the binary numbers would be directed to one OR gate 16a, the second most significant bit of each of the binary numbers would be directed to the second OR gate 16b, and so on, until the least significant bit of each binary number is provided to the sixth and last OR gate 16f.

The OR gates 16a–16f will logic OR the individual bits of the binary numbers together, and thus will provide an output signal on each OR gate output which is the logic OR equivalent of the individual bits of the binary numbers. Accordingly, if the most significant bit of any one binary number is a logic 1 (for positive logic systems), the output signal of the OR gate to which the most significant bits of the binary numbers are provided will also be a logic 1.

The output signals of the individual OR gates are provided to a multiplexer controller 18. The multiplexer controller 18 is basically a read-only memory (ROM) which is programmed to provide an output signal code (a multiplexer control signal) that is used to control a multiplexer or series of multiplexers 20a–20d, as will be described. This function may also be implemented in discrete logic. The multiplexer controller 18 basically reads the output signals of the logic OR gates 16a–16f and, in response to the output signals of the logic OR gates, will fashion a particular output signal code which will be used by the multiplexer or multiplexers 20a–20d in selecting the particular bits of the binary numbers to be passed on to the greatest value determination circuit. An example of ROM programs which may be used for the multiplexer controller will be explained in greater detail.

As stated briefly above, the circuit also includes a multiplexer or a series of multiplexers 20a–20d. The multiplexers receive each of the binary numbers and, in response to the output signal code provided by the multiplexer controller 18, will select certain bits (that is, m number of bits) of each of the binary numbers as output signals, thus providing these bits on outputs 22 of the circuit and then to the greatest value determination circuit for further manipulation.

The circuit of FIG. 2 is designed to select m bits of the R bit binary numbers, where m is less than n, for passing on to the greatest value determination circuit. The circuit of FIG. 2 will select either the most significant active bit of the n bit binary numbers, and m−1 next lower significant bits following the selected most significant active bit, whether the next lower significant bits are active or not, or alternatively, will select m most significant active bits of the n bit binary numbers where the number of m bits is defined by the desired or required uncertainty in the subsequent GOF function.

In this alternative form of the selection process, after the most significant active bit is selected, the additional m−1 bits are selected by repeating the step used to determine which bit was the most significant active bit. That is, a further determination is made as to what bit of all of the binary numbers is the next lower bit from the first bit selected that is active in at least one of the numbers. That next most significant bit is selected from each of the binary numbers, whether that bit is actually active or not in all of the binary numbers, for manipulation by the greatest value determination circuit. This step is repeated until all m−1 additional lower order bits have been selected. Thus, the m number of bits that are selected to be processed by the greatest value determination circuit will include an m number of the most significant bits that are active in one or more of the D bit binary numbers.

An example of how this determination of which bits to select is accomplished can be seen from FIG. 2 and the logic symbols (i.e., the ones and zeros) showing the states of the inputs and outputs of each of the components of the circuit. Table 2 and Table 3 illustrate truth tables (ex., ROM programs) for the multiplexer controller.

As illustrated by FIG. 2, four binary numbers, each having six bits (n=6), are inputted to the circuit. It is assumed that only three bits (m=3) must be selected by the circuit to be passed on to the greatest value determination circuit of FIG. 1. The decimal equivalent values of the four binary numbers are 23, 2, 5 and 20, provided to input sets S5–S8, respectively and read from the top to the bottom of the inputs 14 of the FIG. 2 circuit.

As mentioned previously, the individual OR gates 16a–16f logic OR together the corresponding bits of like decimal value of the binary numbers. Accordingly, the output signals of the OR gates 16a–16f, read consecutively from top to bottom in FIG. 2, should be 0,1,0,1,1 and 1, respectively. The output signals on the logic OR gates 16a–16f are provided as inputs to the multiplexer controller 18.

The multiplexer controller 18 recognizes that the most significant bit of all of the binary numbers is not active. This is because the output signal of the logic OR gate 16a which accepts the most significant bit of each binary number is a logic 0. Thus, it is not necessary to use the most significant bit of the binary numbers in making the greatest value determination. The multiplexer controller 18 also recognizes that the second most significant bit (i.e., having a decimal value of 16) is active, as the output of the second logic OR gate 16b which OR's together the second most significant bit of each binary number has a logic 1 as its output signal. Thus, the circuit of FIG. 2 will choose the second most significant bit of each binary number as one of the m bits to be selected and passed on to the greatest value determination circuit, as at least one of the second most significant bits of the binary numbers is active. At this point, reference should be made to Table 2, shown below.

TABLE 2

| INPUTS OF MUX CONTROLLER | | | | | | MUX CRTL SIGNAL | | BITS SELECTED OF BINARY NOS | | | | | |
|---|---|---|---|---|---|---|---|---|---|---|---|---|---|
| MSB | | | | | LSB | | | MSB | | | | | LSB |
| 1 | X | X | X | X | X | 1 | 1 | 1 | 1 | 1 | 0 | 0 | 0 |
| 0 | 1 | X | X | X | X | 1 | 0 | 0 | 1 | 1 | 1 | 0 | 0 |
| 0 | 0 | 1 | X | X | X | 0 | 1 | 0 | 0 | 1 | 1 | 1 | 0 |
| 0 | 0 | 0 | X | X | X | 0 | 0 | 0 | 0 | 0 | 1 | 1 | 1 |

NOTES:
(a) X = don't care (i.e., 1 or 0 may exist).
(b) A "1" in bits selected columns means that bit is selected.

The multiplexer controller 18 may be programmed to provide a multiplexer control signal that will instruct the multiplexer 20a–20d to select the second, third and fourth most significant bits of the binary numbers (i.e., having decimal values of 16, 8 and 4, respectively), for providing these bits to the greatest value determination circuit (such selection is illustrated by FIG. 2). This selection is made regardless of whether any of the third and fourth most significant bits of the binary numbers are active or not. In such a situation, the uncertainty has been reduced to three, as the two least significant bits are not selected to be passed on to the greatest value determination circuit, from an uncertainty of 7 if the three most significant bits were selected in making the greatest value determination.

However, in accordance with an alternative form of the invention, the multiplexer controller 18 may also be programmed to select the three most significant active bits, as shown in the truth table of Table 3 below.

select this place bit of each of the binary numbers to pass on to the greatest value determination circuit.

The output signal of the logic OR gate which OR's aim the fifth most significant bit (having a decimal value of 2) together is a logic 1 in the example shown in FIG. 2, indicating that at least one of the binary numbers has an active fifth most significant bit. Accordingly, the multiplexer controller 18 will provide a multiplexer control signal to the multiplexer 20a–20d to select this bit also of each binary number to pass on to the greatest value determination circuit.

In summary, the three bits which were selected by the multiplexer 20a–20d to pass on to the greatest value determination circuit were the second most significant bit (i.e., having a decimal value of 16), the fourth most significant bit (having a decimal value of 4), and the fifth most significant bit (having a decimal value of 2), each of which is an active bit in one or more of the binary numbers. Thus, the uncertainty related with the greatest

TABLE 3

| INPUTS OF MUX CONTROLLER | | | | | | MUX CONTROL SIGNAL | | | | | BITS SELECTED OF BINARY NOS | | | | | |
|---|---|---|---|---|---|---|---|---|---|---|---|---|---|---|---|---|
| MSB | | | | | LSB | | | | | | MSB | | | | | LSB |
| 1 | 1 | 1 | X | X | X | 1 | 0 | 0 | 1 | 1 | 1 | 1 | 1 | 0 | 0 | 0 |
| 1 | 1 | 0 | 1 | X | X | 1 | 0 | 0 | 1 | 0 | 1 | 1 | 0 | 1 | 0 | 0 |
| 1 | 1 | 0 | 0 | 1 | X | 1 | 0 | 0 | 0 | 1 | 1 | 1 | 0 | 0 | 1 | 0 |
| 1 | 1 | 0 | 0 | 0 | X | 1 | 0 | 0 | 0 | 0 | 1 | 1 | 0 | 0 | 0 | 1 |
| 1 | 0 | 1 | 1 | X | X | 0 | 1 | 1 | 1 | 1 | 1 | 0 | 1 | 1 | 0 | 0 |
| 1 | 0 | 1 | 0 | 1 | X | 0 | 1 | 1 | 1 | 0 | 1 | 0 | 1 | 0 | 1 | 0 |
| 1 | 0 | 1 | 0 | 0 | X | 0 | 1 | 1 | 0 | 1 | 1 | 0 | 1 | 0 | 0 | 1 |
| 1 | 0 | 0 | 1 | 1 | X | 0 | 1 | 0 | 0 | 0 | 1 | 0 | 0 | 1 | 1 | 0 |
| 1 | 0 | 0 | 1 | 0 | X | 0 | 1 | 0 | 1 | 1 | 1 | 0 | 0 | 1 | 0 | 1 |
| 1 | 0 | 0 | 0 | X | X | 0 | 1 | 0 | 1 | 0 | 1 | 0 | 0 | 0 | 1 | 1 |
| 0 | 1 | 1 | 1 | X | X | 0 | 1 | 0 | 0 | 1 | 0 | 1 | 1 | 1 | 0 | 0 |
| 0 | 1 | 1 | 0 | 1 | X | 0 | 1 | 0 | 0 | 0 | 0 | 1 | 1 | 0 | 1 | 0 |
| 0 | 1 | 1 | 0 | 0 | X | 0 | 0 | 1 | 1 | 1 | 0 | 1 | 1 | 0 | 0 | 1 |
| 0 | 1 | 0 | 1 | 1 | X | 0 | 0 | 1 | 1 | 0 | 0 | 1 | 0 | 1 | 1 | 0 |
| 0 | 1 | 0 | 1 | 0 | X | 0 | 0 | 1 | 0 | 1 | 0 | 1 | 0 | 1 | 0 | 1 |
| 0 | 1 | 0 | 0 | X | X | 0 | 0 | 1 | 0 | 0 | 0 | 1 | 0 | 0 | 1 | 1 |
| 0 | 0 | 1 | 1 | 1 | X | 0 | 0 | 0 | 1 | 1 | 0 | 0 | 1 | 1 | 1 | 0 |
| 0 | 0 | 1 | 1 | 0 | X | 0 | 0 | 0 | 1 | 0 | 0 | 0 | 1 | 1 | 0 | 1 |
| 0 | 0 | 1 | 0 | X | X | 0 | 0 | 0 | 0 | 1 | 0 | 0 | 1 | 0 | 1 | 1 |
| 0 | 0 | 0 | X | X | X | 0 | 0 | 0 | 0 | 0 | 0 | 0 | 0 | 1 | 1 | 1 |

Accordingly, the second most significant bit (having a decimal value of 16) is selected, as at least one of the binary numbers has a logic 1 in that bit place. However, none of the binary numbers has an active third most significant bit (having a decimal value of 8). Accordingly, this bit need not be selected for further evaluation by the greatest value determination circuit.

In such a case, the multiplexer controller 18 will look to the fourth most significant bit (having a decimal value of 4) to determine if this bit is active in any one of the binary numbers. Since the output signal of the logic OR gate that OR's aim the fourth most significant bit of the binary numbers together is a logic 1, the multiplexer controller 18 will provide the multiplexer 20a–20d with a control signal that will instruct the multiplexer to value determination has now been reduced to 1.

There are many instances, of course, when only one or two bits are commonly active in all of the binary numbers, as shown in Table 3. In such a case, the multiplexer controller may instruct the multiplexer either to select only those bits that are active, or to select those active bits and any arbitrary inactive bits (such as, inactive bits of lesser value than the most significant active bit selected) remaining out of the m number of bits to be selected.

Figure 3B:
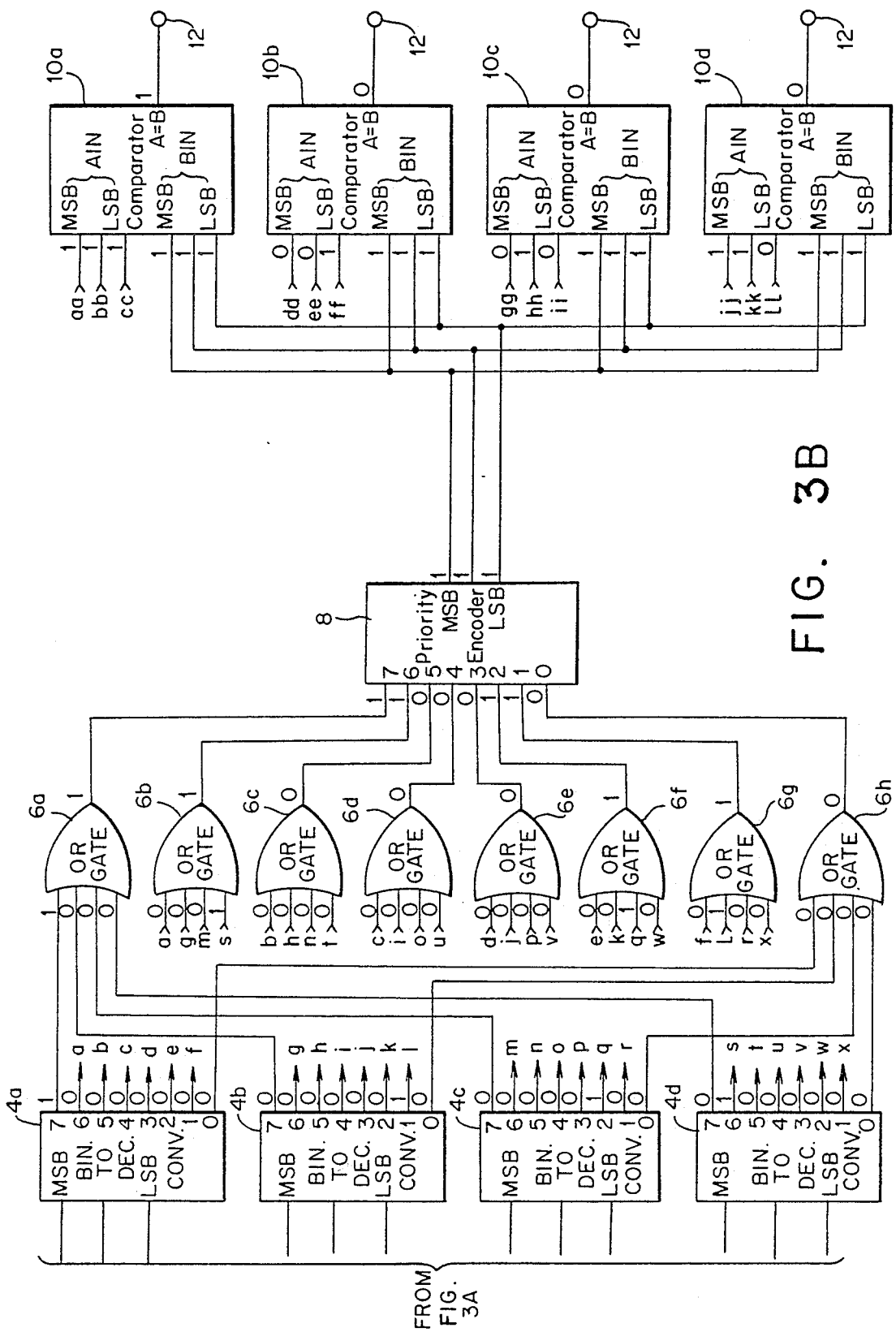
FIG. 3 comprising FIGS. 3A and 3B, which are a block diagram illustrating how the apparatus of FIG. 2 may be interconnected with the apparatus of FIG. 1 and illustrating the alternate method for selection of the uncertainty.
Figure 3A:
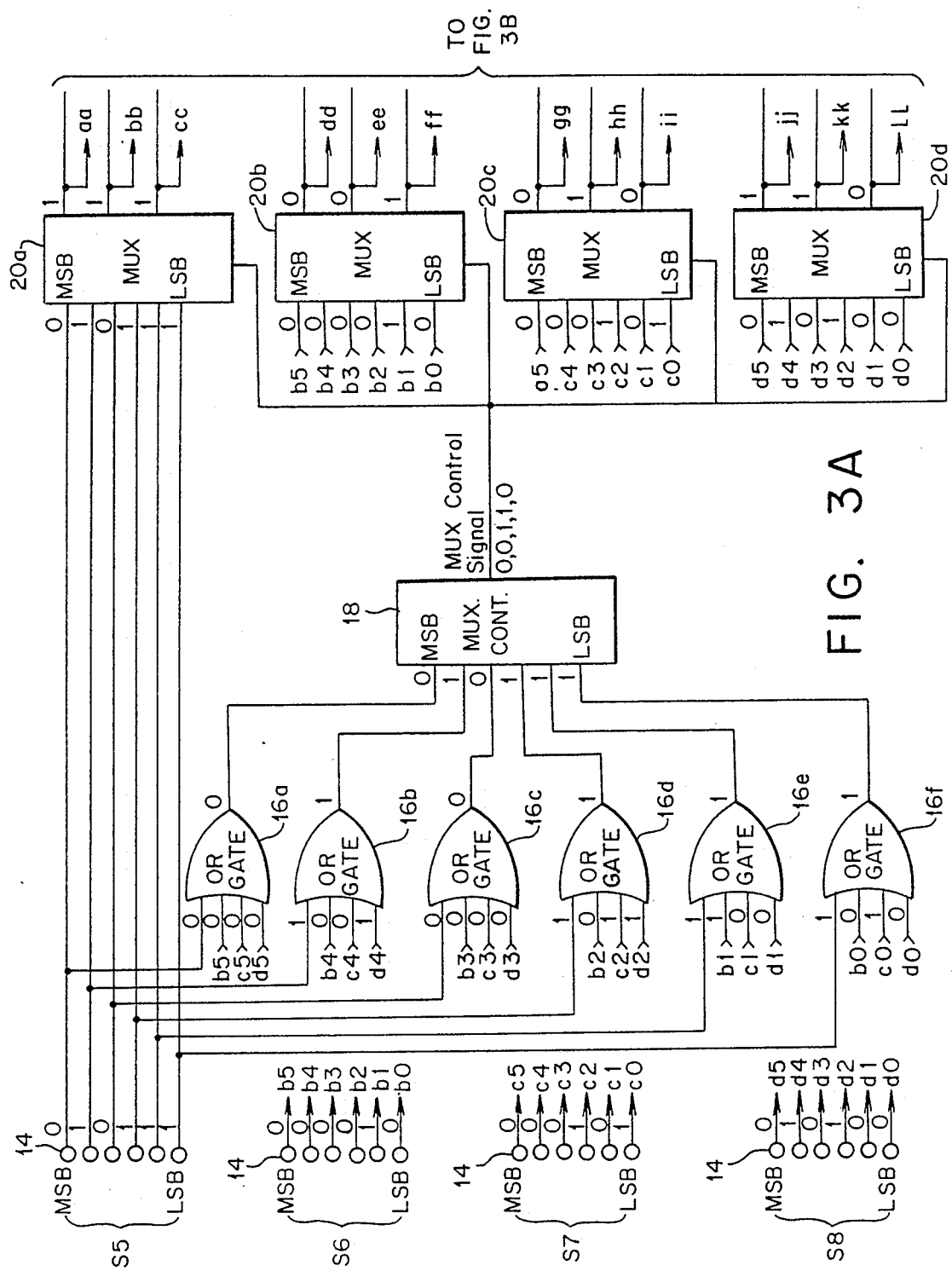

As shown in FIGS. 3A and 3B which are a combined block diagram of FIGS. 1 and 2, using the example of the binary numbers shown in FIG. 2, the greatest value determination circuit will identify the first binary number (having a decimal value of 23) provided on input set S5 as the number having the greatest value, and the uncertainty associated with this determination has been reduced to 1, from a possible 7 if only the three most significant bits of the six bit binary numbers had been chosen to make the greatest value determination, when the alternate technique of the m bit selection is used.

The components employed in the greatest value determination circuit of FIG. 1 and the circuit of FIG. 2 which minimizes uncertainty associated with the determination are all components which are readily purchasable and are interconnected according to well-known techniques. For example, if one is using TTL logic, the logic OR gates 6, 16 may be implemented by use of several dual four input NOR gates (Part No. 7425), manufactured by many companies, including Texas Instruments; the priority encoder 8 may be implemented by using Part No. 74148; the binary-to-decimal converter 4 may be implemented by the parallel connection of a binary-to-BCD converter (Part No. 74185a) and a BCD-to-decimal decoder (Part No. 7442); the comparators 10 may be a series of magnitude comparators, such as Part No. 7485; the multiplexers 20 may be implemented by using a series of four line-to-1 line data multiplexers (Part No. 74153); and the multiplexer controller 18 may be a programmable read-only memory (PROM), such as Part No. 74187.

It is also recognized that the multiplexer controller 18 may be in some instances a priority encoder, such as by using Part No. 74148 or the like, or a series of priority encoders, where the most significant input bit of the priority encoder is connected to the logic OR gate 16a which logic OR's aim the most significant bits of the binary numbers together, the other input bits of the priority encoders being connected to corresponding, lower order bit outputs of the other logic OR gates 16b-16f.

It is also envisioned that the multiplexer controller 18 may receive the binary numbers directly, and be programmed to perform the logic OR'ing function of the logic OR gates internally.

The greatest value determination apparatus of the present invention identifies which of a plurality of binary numbers has the greatest value in a relatively short time period and by utilizing a minimal number of physical devices. The apparatus, in conjunction with the apparatus illustrated by FIG. 2, also minimizes any uncertainty associated with the determination when fewer than all of the bits of the binary numbers may be compared.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. Apparatus for determining which of a plurality of binary numbers has the greatest value, which comprises:
   binary-to-decimal converting means for converting each of the binary numbers to a decimal equivalent code;
   means responsive to the decimal equivalent codes of the converted binary numbers for determining which of the decimal equivalent codes has the greatest value;
   means for converting the decimal equivalent code having the greatest value to a binary number; and
   means for comparing the greatest value binary number of the decimal-to-binary converting means with each of the plurality of binary numbers, the comparing means identifying the binary number which equals the greatest value binary number of the decimal-to-binary converting means as the binary number having the greatest value.

2. Apparatus for determining which of a plurality of binary numbers has the greatest decimal equivalent, which comprises:
   binary-to-decimal converting means for converting each of the binary numbers to a decimal equivalent code having at least a most significant bit and a least significant bit each representing a different decimal value;
   means responsive to the decimal equivalent codes for logic OR'ing each most significant bit of the decimal equivalent codes together and each least significant bit of the decimal equivalent codes together, the logic OR'ing means providing output signals representing the OR'ed together most significant bits and the least significant bits of the decimal codes;
   means responsive to the output signals of the logic OR'ing means for determining which or the OR'ing means output signals that are active has the greatest value, and for converting the decimal value of the OR'ing means output signal having the greatest value to a binary number; and
   means responsive to the determining means for comparing the greatest value binary number of the determining means with each of the plurality of binary numbers, the comparing means identifying the binary number which equals the greatest value binary number of the determining means as the binary number which has the greatest decimal equivalent.

3. Apparatus for determining which of a plurality of binary numbers has the greatest decimal equivalent, which comprises:
   binary-to-decimal code conversion means for converting each of the binary numbers to a decimal equivalent code, the binary-to-decimal code conversion means providing a plurality of sets of parallel output signals, each set representing a decimal equivalent code corresponding to a respective one of the binary numbers, each output signal of each set having a greater or a lesser decimal value than any other output signal of the same set, and having a decimal value equal to that of a corresponding output signal of any other set;
   logic OR'ing means responsive to the output signals of the binary-to-decimal code conversion means for logic OR'ing together corresponding equally weighted output signals of each of the plurality of sets of parallel output signals of the binary-to-decimal code conversion means, the logic OR'ing means providing a plurality of output signals representative of the logic OR'ed state of each of the OR'ed together output signals of the binary-to-decimal code conversion means;
   priority encoder means responsive to the output signals of the logic OR'ing means for determining which of the output signals that are active has the greatest value, and for converting the decimal value of the logic Or'ing means output signal having the greatest value to a binary number, the priority encoder means providing a plurality of output signals representative of a binary equivalent of the decimal value of the logic OR'ing means output signal having the greatest value; and comparing means for comparing the output signal of the priority encoder means with each of the plurality of binary numbers provided to the binary-to-decimal code conversion means, the comparing means providing an output signal indicative of the binary number which is the same as the output signal of the priority encoder means, the comparing means identifying the binary number which is the same as the output signal of the priority encoder means as the binary number having the greatest value.

4. Apparatus for minimizing the uncertainty associated with a method for determining which of a plurality of binary numbers, each number having n bits, has the greatest value when the determination method uses at most only m number of the n bits of each binary number, where m is less than n, which comprises:

multiplexer means being responsive to a multiplexer control signal for selecting at most m number of the n bits for manipulation in the greatest value determination method, each of the binary numbers being provided to the multiplexer means, the multiplexer means providing an output signal in the form of a plurality of binary numbers, each comprising at most m bits of the corresponding n bit binary numbers; and multiplexer control means for controlling the multiplexer means in selecting the at most m number of bits of the n bit binary numbers for manipulation in the greatest value determination method, the multiplexer control means being responsive to the plurality of n bit binary numbers, the multiplexer control means determining at least the most significant bit of all of the binary numbers that is active in at least one of the numbers, and providing the multiplexer control signal to the multiplexer means, the multiplexer means selecting said bit from each of the binary numbers in response to the multiplexer control signal.

5. An apparatus as defined by claim 4, wherein the m number of bits selected by the multiplexer means from each binary number includes the most significant bit of all of the binary numbers that is active in at least one of the binary numbers and m−1 number of next lower significant bits immediately following the selected most significant active bit.

6. An apparatus as defined by claim 4, wherein the m number of bits selected by the multiplexer means from each binary number includes at most m number of the most significant bits of the plurality of binary numbers that are active in at least one of the binary numbers.

7. An apparatus as defined by claim 4, which further comprises logic OR'ing means for logic OR'ing together bits of like decimal value of the plurality of binary numbers, the logic OR'ing means providing an output signal representative of the logic OR'ed together bits of like decimal value of the binary numbers, the multiplexer control means being responsive to the output signal of the logic OR'ing means.

8. Apparatus for determining which of a plurality of binary numbers, each having n bits, has the greatest value and for minimizing any uncertainty associated with the determination when at most only m bits, m being less than n, of each of the n bit binary numbers is used in the determination, which comprises:

logic OR'ing means for logic OR'ing together each bit of like decimal value of the n bit binary numbers, the logic OR'ing means providing an output signal representative of the logic OR'ed together bits of like value of the n bit binary numbers;

multiplexer control means for controlling a multiplexer means in selecting the at most m number of bits of the n bit binary numbers, the multiplexer control means being responsive to the output signals of the logic OR'ing means, the multiplexer control means determining at least which of the output signals of the OR'ing means that are active has the greatest decimal value, the multiplexer control means providing a multiplexer control signal;

multiplexer means being responsive to the multiplexer control signal for selecting at most m number of the n bits of each of the binary numbers, each of the binary numbers being provided to the multiplexer means, the multiplexer means providing an output signal in the form of a plurality of binary numbers, each number comprising at most m bits of a corresponding n bit binary number;

binary-to-decimal code conversion means for converting each of the m bit binary numbers to a decimal equivalent code the binary-to-decimal code conversion means providing a plurality of sets of parallel output signals, each set representing a decimal equivalent code corresponding to a respective one of the m bit binary numbers provided as an output signal by the multiplexer means, each output signal of each set having a greater or a lesser decimal value than any other output signal of the same set, and having a decimal value equal to that of a corresponding output signal of any other set;

logic Or'ing means responsive to the output signals of the binary-to-decimal code conversion means for logic OR'ing together corresponding equally weighted output signals of each of the plurality of sets of parallel output signal of the binary-to-decimal code conversion means, the logic OR'ing means providing a plurality of output signals representative of the logic OR'ed state of each of the OR'ed together output signals of the binary-to-decimal code conversion means;

priority encoder means responsive to the output signals of the logic OR'ing means for determining which of the compared output signals that are active has the greatest value, and for converting the decimal value of the logic OR'ing means output signal having the greatest value to a binary number, the priority encoder means providing a plurality of output signals representative of a binary equivalent of the decimal value of the logic OR'ing means output signal having the greatest value; and means for comparing the output signal of the priority encoder means with each of the plurality of m bit binary numbers provided to the binary-to-decimal code conversion means, the comparing means providing an output signal indicative of the m bit binary number which is the same as the output signal of the priority encoder means, the comparing means identifying the n bit binary number having the at most m number of binary bits which are the same as the output signal of the priority encoder means as the n bit binary number having the greatest value.

9. A method for determining which of a plurality of binary numbers has the greatest value, which comprises the steps of:
converting each of the binary numbers to a decimal equivalent code;
determining which of the decimal equivalent codes has the greatest value;
converting the decimal equivalent code determined to have the greatest value to a binary number; and
comparing the converted greatest value binary number with each of the plurality of binary numbers, the comparing means identifying the binary number which equals the converted greatest value binary number as the binary number having the greatest value.

10. A method for determining which of a plurality of binary numbers has the greatest decimal equivalent, which comprises the steps of:
converting each of the binary numbers to a decimal equivalent code having at lest a most significant bit and a least significant bit each representing a different decimal value;
logic OR'ing each most significant bit of the decimal equivalent codes together and each least significant bit of the decimal equivalent codes together, and providing output signals representing the OR'ed together most significant bits and the least significant bits of the decimal codes;
determining which of the output signals that are active has the greatest value, and converting the decimal value of the output signal having the greatest value to a binary number; and
comparing the converted greatest value binary number with each of the plurality of binary numbers, the comparing means identifying the binary number which equals the converted greatest value binary number as the binary number which has the greatest decimal equivalent.

11. A method for determining which of a plurality of binary numbers has the greatest decimal equivalent, which comprises the steps of: conveying each of the binary numbers to a decimal equivalent code, and providing a plurality of sets of parallel first output signals, each set representing a decimal equivalent code corresponding to a respective one of the binary numbers, each first output signal of each set having a greater or a lesser decimal value than any other first output signal of the same set, and having a decimal value equal to that of a corresponding first output signal of any other set;
logic OR'ing together corresponding equal first output signals of each of the plurality of sets of parallel first output signals, and providing a plurality of second output signals representative of the logic OR'ed state of each of the OR'ed together first output signals;
determining which of the second output signals that are active has the greatest value, and converting the decimal value of the second output signal having the greatest value to a binary number, and providing a plurality of third output signals representative of a binary equivalent of the decimal value of the second output signal having the greatest value; and
comparing the third output signal with each of the plurality of binary numbers, and providing a fourth output signal indicative of the binary number which is the same as the third output signal, the comparing means identifying the binary number which is the same as the third output signal as the binary number having the greatest value.

12. A method for minimizing the uncertainty associated with a method for determining which of a plurality of binary numbers, each number having n bits, has the greatest value when the determination method uses at most only m number of the n bits of each binary number, where m is less than n, which comprises the steps of:
selecting at most m number of the n bits for manipulation in the greatest value determination method, and providing an output signal in the form of a plurality of binary numbers, each comprising at most m bits of the corresponding n bit binary numbers; and
controlling the selection of the at most m number of bits of the n bit binary numbers for manipulation in the greatest value determination method by determining at least the most significant bit of all of the binary numbers that is active in at least one of the numbers, and providing a control signal indicating which bits of the binary numbers should be selected.

13. A method as defined by claim 12, wherein the m number of bits selected from each binary number includes the most significant bit of all of the binary numbers that is active in at least one of the binary numbers and m -1 number of next lower significant bits immediately following the selected most significant active bit.

14. A method as defined by claim 12, wherein the m number of bits selected by the multiplexer means from each binary number includes at most m number of the most significant bits of the plurality of binary numbers that are active in at least one of the binary numbers.

* * * * *

UNITED STATES PATENT AND TRADEMARK OFFICE
CERTIFICATE OF CORRECTION

Page 1 of 2

PATENT NO. : 4,998,219
DATED : March 5, 1991
INVENTOR(S) : Richard M. Frauenglass It is certified that error appears in the above-identified patent and that said Letters Patent is hereby corrected as shown below:

Column 4, line 31, delete "20"

Column 4, line 62, "4-4d" should read -- 4a-4d --

Column 5, line 19, delete "aim"

Column 5, line 43, "10-10d" should read -- 10a-10d --

Column 6, line 2, "10a-10" should read -- 10a-10d --

Column 6, line 48, delete "o"

Column 7, line 14, "16-a16f" should read -- 16a-16f --

Column 7, line 65, "R bit" should read -- n bit --

Column 8, line 23, "D bit" should read -- n bit --

UNITED STATES PATENT AND TRADEMARK OFFICE
CERTIFICATE OF CORRECTION

PATENT NO. : 4,998,219
DATED : March 5, 1991
INVENTOR(S) : Richard M. Frauenglass It is certified that error appears in the above-identified patent and that said Letters Patent is hereby corrected as shown below:

Column 9, line 52, after end of "Table 3," insert:
-- Notes:
    a) X=don't care (i.e., 1 or 0 may exist).
    b) A "1" in bits selected columns means that bit is selected. --

Column 9, line 65, delete "aim"

Column 10, line 16, delete "aim"

Column 11, line 33, delete "aim"

Col. 12, Claim 2, line 27, change "or" to -- of --

Col. 14, Claim 8, line 43, "signal" should be plural -- signals --

Col. 15, Claim 10, line 22, correct "lest" to --least --

Signed and Sealed this

Fifteenth Day of September, 1992

Attest:

DOUGLAS B. COMER

Attesting Officer     Acting Commissioner of Patents and Trademarks